United States Patent [19]

Miura et al.

[11] Patent Number: 4,533,413

[45] Date of Patent: Aug. 6, 1985

[54] REINFORCED MATERIAL INCORPORATING FINE COMPOSITE POWDER AND METHOD AND APPARATUS FOR MAKING THE SAME

[75] Inventors: Hirohisa Miura; Hiroshi Sato; Toshio Natsume; Hidenori Katagiri, all of Aichi, Japan

[73] Assignee: Toyota Jidosha Kabushiki Kaisha, Toyota, Japan

[21] Appl. No.: 608,113

[22] Filed: May 8, 1984

[30] Foreign Application Priority Data

May 10, 1983 [JP] Japan .............................. 58-081535

[51] Int. Cl.$^3$ ............................................ C22C 23/02
[52] U.S. Cl. .................................... 148/420; 266/200; 266/207; 420/402; 420/407; 420/590; 428/545
[58] Field of Search ......... 75/0.5 BC, 0.5 B, 0.5 BA, 75/0.5 C, 252; 148/420, 406; 420/590, 402, 407; 266/200, 207; 428/545

[56] References Cited

U.S. PATENT DOCUMENTS

| | | | |
|---|---|---|---|
| 3,061,482 | 10/1962 | Grant | 75/252 |
| 3,884,676 | 5/1975 | Nadkarni et al. | 75/0.5 BC |
| 3,901,689 | 8/1975 | Pelton | 75/0.5 BC |
| 4,192,672 | 3/1980 | Moskowitz et al. | 75/252 |

Primary Examiner—Wayland Stallard
Attorney, Agent, or Firm—Oblon, Fisher, Spivak, McClelland & Maier

[57] ABSTRACT

A composite material made of a matrix of a first metal and reinforcing first particles with average particle diameter less than or equal to about ten microns dispersed in the first metal matrix, with the reinforcing first particles each having a composite structure, being made up of a plurality of fine second particles of a ceramic made by reacting together a second metal and a gas and being combined with one another by a matrix of a third metal. This composite material is made by vaporizing the second metal, mixing the vapor with the gas, expanding the mixture through a nozzle means for providing adiabatic expansion cooling under reaction between the second metal and the gas to provide the fine second particles of ceramic, producing vapor of the third metal and mixing it in with the fine second particles at the downstream of the first nozzle means, directing the resulting mixture through a second expansion nozzle means to form the first particles of composite structure, and directing an output flow from the second nozzle means into a bath of the first metal to amalgamate the first particles with the matrix of first metal.

16 Claims, 9 Drawing Figures

REINFORCED MATERIAL INCORPORATING FINE COMPOSITE POWDER AND METHOD AND APPARATUS FOR MAKING THE SAME

BACKGROUND OF THE INVENTION

The present invention relates to a composite material and to an apparatus and to a method for making such a composite material; and more particularly relates to such a composite material which is reinforced by fine powder particles which are themselves made up in a composite structure and includes extremely small ceramic particles in a matrix of metal, and to an apparatus and method for this type of composite material.

The present invention was originally made in Japan, and the first patent application made therefor was Japanese Patent Application No. 81535/83, of which priority is being claimed in the present application; and it is hereby desired to incorporate the subject matter of that previous Japanese patent application into this specification by reference; a copy is appended to this specification.

Ceramics such as alumina, silicon nitride, tungsten carbide, and so on are far superior in heat resistance and wear resistane to metals, and therefore there have been in the past various attempts to make various structural members of various machines and devices out of composite materials in which ceramic powder particles are dispersed within a matrix of metal, as well as composite materials in which matrix metal is reinforced by ceramic fibers.

The problems with such composite materials made with ceramic reinforcing powder particles in matrix metal are that the reinforcing powder particles are extremely brittle, that it is difficult to uniformly disperse the reinforcing particles in the matrix metal, and that the intimacy between the reinforcing particles and the matrix metal is not always very good. Because of these problems, such composite materials are not in practice used very much, except for some tool materials such as cermet.

The problem of brittleness of the reinforcing ceramic powder particles might be thought of to be solvable by using as reinforcing powder particles small particles which themselves had a composite structure, being made of still finer ceramic particles set within a matrix of metal; but although such a substance can be conceived of in theory there is no practical way in which such fine composite powder particles can be made with an average particle diameter of 10 microns or less, which is a smallness which is necessary for their use as reinforcing powder particles. Therefore, up to the present, it has not been possible to manufacture a composite material utilizing such composite reinforcing powder particles.

SUMMARY OF THE INVENTION

In view of the above detailed problems inherent in the prior art methods of making composite materials, especially composite materials which consist of matrix metal reinforced by particles which themselves are of a compound structure, and with the expectation that such a composite material would be superior in mechanical properties such as hardness, tensile strength, and wear resistance, the present inventors sought to provide a composite material in which the reinforcing particles, being of average diameter 10 microns or less, themselves were made of composite material, and performed many experimental researches in this connection.

Accordingly, it is the primary object of the present invention to provide a composite material, a method for making it, and a device for practicing the method, which can efficiently and effectively manufacture such a composite material as outlined above in reasonable amounts.

It is a further object of the present invention to provide such a composite material, and a method for making it and a device for practicing the method, which can produce a composite material of superior mechanical properties.

According to the most general aspect of the present invention, these and other objects are accomplished by a composite material, comprising a matrix of a first metal and reinforcing first particles with average particle diameter less than or equal to about ten microns dispersed in said matrix of said first metal, said reinforcing first particles each having a composite structure which comprises a plurality of fine second particles of a ceramic and a matrix of a second metal; and by a device for making a composite material, comprising: a first vaporization chamber for producing a first metal vapor in; means for heating said first vaporization chamber; an exit flow path from said first vaporization chamber, comprising a first expansion nozzle means therealong; means for introducing a flow of reaction gas to be mixed with said metal vapor at the upstream of said first nozzle means; a second vaporization chamber for producing a second metal vapor in; means for heating said second vaporization chamber; an exit flow path from said second vaporization chamber which leads into a mixing area where said second metal vapor is mixed with the mixture of said reaction gas and said first metal vapor after said mixture has flowed through said first nozzle means; a second expansion nozzle means which leads from said mixing area; a composite material production zone into which said second nozzle means leads; a molten metal bath in said composite material zone into which a flow out from said second nozzle means is directed; and means for evacuating the interior of said device; and by a method for making a composite material comprising a matrix of a first metal and reinforcing first particles with average particle diameter less than or equal to about ten microns dispersed in said matrix of said first metal, said reinforcing first particles each having a composite structure which comprises a plurality of fine second particles of a ceramic made by reacting together a second metal and a gas and being combined by a matrix of a third metal, comprising the steps of: mixing vapor of said second metal with said reaction gas and directing the mixture thereof through a first expansion nozzle means for adiabatic expansion cooling to generate fine particles of the compound of said second metal and said reaction gas; producing vapor of said third metal and mixing it in with said fine particles of said compound at the downstream of said first nozzle means; directing the resulting mixture through a second expansion nozzle means; and directing an output flow from said second nozzle means into a bath of said first metal.

Since the reinforcing powder particles themselves are made of composite material having ceramic particles as reinforcing material embedded in matrix metal, their hardness is in principle close to that of the ceramic, while due to the presence of the matrix metal therein their toughness is also good (although these matters cannot be directly measured, due to the smallness of the particles). These reinforcing powder particles strongly oppose the movement of dislocations in the basic matrix metal, and also reduce the wear of the basic matrix metal. Also, since the affinity between the matrix material of the particles and the basic matrix metal is good, the composite material according to the present invention is superior to conventional composite materials using reinforcing particles which are composed completely of ceramic, especially in toughness and shock resistance, and also in resistance to wear, and is particularly superior with regard to resistance to dropping off of the reinforcing particles during frictional rubbing against another body.

In general, the smaller are the diameters of the particles of a composite material powder, the better is the composite material powder for use as raw material for making particle dispersion composite materials, because the better the mechanical properties of the composite material become, due to the increase in the total surface area of the particles of the reinforcing powder relative to their total weight, which increases the relative importance of their surface activity. Further, the better these particles are dispersed in the matrix material and the higher the density at which they are dispersed, the better are the mechanical properties of the resulting composite material, both at normal temperatures and at high temperatures. This is because the strength of a composite material is largely determined by its resistance against deformation, and on the microscopic level deformation is a result of the formation and movement of dislocations. In particular, in a particle dispersion type composite material, it has already been clarified that the strength is improved due to the fact that the composite particles obstruct the movement of dislocations. For instance, tensile strength may be expressed by the formula:

$$t_y = t_m + Gmb/l$$

where $t_y$ is the yield stress, $t_m$ is the yield stress of the matrix material, b is the magnitude of the Berger spectrum, l is the average mean distance between particles, and Gm is the rigidity of the matrix material.

From this equation, it can be seen that the smaller the average distance between the particles of the reinforcing powder material, the greater is the tensile strength of the composite material.

Further, the following equation holds:

$$l = 2d(1 - Vp)/3 Vp$$

where d is the size of the reinforcing particles, Vp is the volume ratio at which they are mixed, and l is the average mean distance between particles.

This means that the greater is the volume ratio of the dispersed powder particles, and the smaller their diameter d is, the smaller becomes their average distance apart l. As a conclusion from these equations, therefore, the strength of a particle dispersion type composite material becomes greater, the finer is the dispersed composite material, and the higher is its packing density. Therefore, it has been realized for a long time that it is very desirable to make reinforcing powder for composite material with as small a particle diameter as possible, and energetic efforts have been expended with this aim in view. Thus, in the case of the material according to the present invention described above, since the average particle diameter of the reinforcing particles therein is of the order of ten microns or less (and preferably is of the order of five microns or less), it is far superior to any such material which might in the prior art have theoretically been able to be manufactured by using as dispersion powder material particles of composite material made of small particles of ceramic embedded in a matrix of metal and formed by mechanical pulverization or the like.

The present inventors proposed, in U.S. patent application Ser. No. 471,003, now U.S. Pat. No. 4,484,943, which is assigned to the same assignee as the present application, a method of making metallic compound fine powder by rapidly cooling a mixture of a gas and a metallic vapor which forms a compound with said gas, the meaning of "compound" being in this case intended as a chemical compound of a metal and a non-metallic element, a compound of metals, and a mixture of these with a metal or metals, and also showed that the purity of a metallic compound fine powder can be even further improved by utilizing a special type of divergent nozzle. The present invention takes these concepts as a point of departure, and elaborates upon those concepts by reacting a first metal vapor with a gas by adiabatic expansion cooling in a first nozzle means to form a compound which is a ceramic in the form of extremely fine particles, then mixes these extremely fine ceramic particles in with another metal vapor and by the use of a second nozzle means condenses the resultant mixture by adiabatic expansion cooling to form compound material particles with particle average diameter less than about ten microns, and finally directs these compound particles into a bath of a matrix metal, to form the resulting compound material.

Since the composite fine reinforcing particles are thus manufactured in vacuum or in a protective environment, and are introduced straight into the bath of molten matrix metal as soon as they are formed and before they can lose their surface activity, they combine very well with the matrix metal, having good wettability with respect thereto. Thereby, there is provided a composite material with very good intimacy between the matrix material and the composite reinforcing particles, and the composite material according to the present invention is superior to conventional composite materials using reinforcing particles which are composed completely of ceramic, especially in toughness and shock resistance and in resistance to wear, and is particularly superior with regard to resistance to dropping off of the reinforcing particles, as for example during frictional rubbing against another body.

Further, since during the practice of the method of the present invention the jet of gas and particles issuing from the second nozzle means against the surface of the matrix metal in the bath stirs up said matrix metal, thereby the mixing in of the reinforcing particles into the matrix metal is ensured to be good and even. As opposed to conventional methods of making particle dispersion material, therefore, no special mixing means is required for amalgamating the reinforcing particles into the matrix metal. Thereby the efficiency and the economy of the present invention are promoted.

Also, the present invention is well suited to being practiced as a continuous process, rather than in a batch mode, because the molten matrix metal in the bath can conveniently be flowed past the outlet of the second nozzle means. This further promotes economy and convenience.

With regard to the operating conditions of the first and the second nozzle means, they can be suitably tailored to the particular application. Suppose that the pressure and the temperature of the mixture gas upstream of the nozzle in which adiabatic cooling is performed are $P_1$ (expressed in torr) and $T_1$ (expressed in °K) and the pressure and temperature of the mixture gas downstream of the nozzle are $P_2$ (again expressed in torr) and $T_2$ (again expressed in °K), then in the case of a convergent-divergent nozzle the flow speed of the mixture gas passing through the convergent-divergent nozzle is supersonic when the pressure ratio $P_1/P_2$ is greater than or equal to 2.1. When the pressure ratio is relatively small (for instance when $P_1/P_2$ is equal to 2.5), even when it is within the said range so the downstream speed of the mixture gas is supersonic, the temperature $T_2$ of the gas after passing through the convergent-divergent nozzle is relatively high. The temperature $T_2$ may be approximately estimated from the following equation, where k is the specific heat ratio of the mixture gas:

$$T_2 = T_1 \times (P_2/P_1)^{(k-1)/k}$$

Thus, by appropriately controlling the various parameters of the process such as the shape and dimensions of the nozzle means, the pressure conditions before and after the nozzle means, and the operating conditions of the nozzle means, thereby it is possible to appropriately specify the average size of the fine ceramic particles, the volume ratio of the ceramic particles in the powder particles, the amount of fine composite powder produced, the speed of introducing it into the matrix metal, its average particle diameter, and the volume ratio of reinforcing material in the resulting composite material.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

DESCRIPTION OF THE PREFERRED EMBODIMENTS

The present invention will now be described with reference to the preferred embodiments thereof, and with reference to the appended drawings.

Embodiment One

Figure 1:
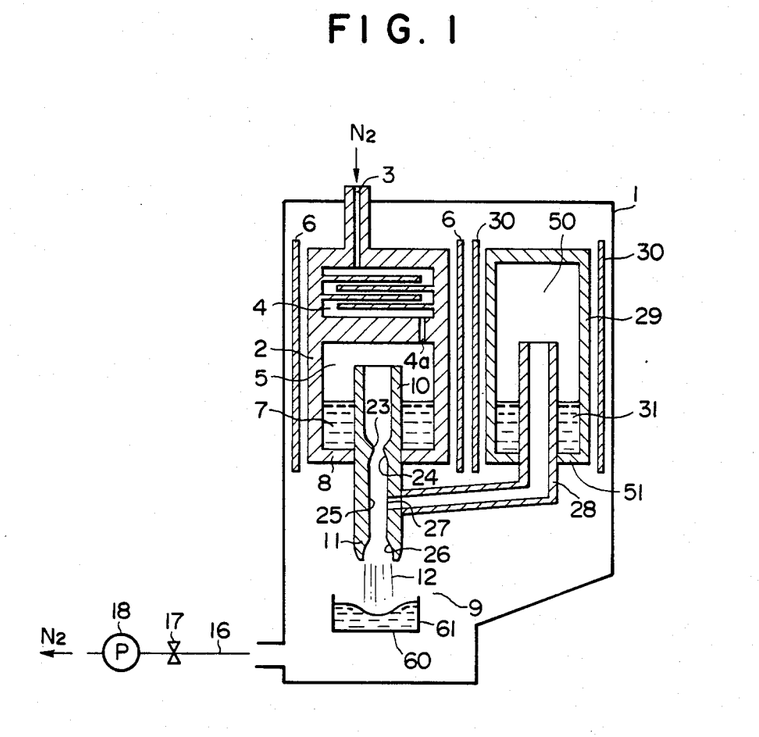
FIG. 1 is a schematic sectional view of an apparatus which is the first preferred embodiment of the device of the present invention and incorporates a convergent-divergent nozzle with two expansion portions and a molten matrix metal bath, for making a composite powder reinforced material which is a first preferred embodiment of the reinforced material of the present invention, in a manner according to the first preferred embodiment of the method of the present invention.

FIG. 1 shows a schematic cross section of the first preferred embodiment of the device of the present invention. In this figure, the reference numeral 1 donotes a furnace shell which is formed as a substantially closed container. In the upper part of this furnace shell 1 there is disposed a first melting pot 2, the upper portion of which is formed with a gas preheating chamber 4 to which is communicated a gas introduction aperture 3 which is communicated with the outside for introduction of a reaction gas such as nitrogen gas, and the lower portion of which is formed with a metallic vapor production and reaction chamber 5 which is communicated via an aperture 4a with the gas preheating chamber 4. A heater 6 is disposed around the first melting pot 2 for keeping it at a predetermined temperature which will be hereinafter referred to as $T_1$, and a mass 7 of metal charged into the lower part of the metallic vapor production and reaction chamber 5 is kept in the molten state by the action of this heater 6 and is, further, boiled so as to emit metallic vapor.

Through the bottom wall 8 of the chamber 5 there is fitted a conduit 10 which leads to a composite material production zone 9, and the upper end of this conduit 10 protrudes quite a long way into the metallic vapor production and reaction chamber 5 so as to open to the upper portion of said chamber 5, above the surface of the molten metal mass 7 therein. The interior of this conduit defines a nozzle 11, and this nozzle 11 opens downward into the composite material production zone 9 so as to direct a jet flow 12 of gas and powder downwards thereinto as will be explained shortly. Below the end of the nozzle 11 in the composite material production zone 9 and displaced therefrom by a certain distance there is provided, for catching fine composite powder particles produced in the jet flow 12 as will be explained shortly, opposing the tip of the convergent-divergent nozzle 11 at a certain distance away therefrom, a bath 60 adapted for receiving a quantity of molten matrix metal 61. A heater, which is not shown, is provided for melting the matrix metal 61, and for keeping it in the molten state, (if actually extra heat is required for this purpose). A vacuum pump 18 is provided for exhausting, via a conduit 16 under the control of a valve 17, the reaction gas such as nitrogen gas introduced through the gas introduction aperture 3 from the composite material production zone 9 and from the whole device, so as to maintain the interiors of the metallic vapor production and reaction chamber 5 and of the composite material production zone 9 at predetermined pressures, which will be hereinafter referred to as $P_1$ and $P_2$ respectively.

The nozzle 11 has a throat portion 23, a first expansion portion 24 immediately downstream of said throat portion 23, a constant cross section portion 25 the upstream end of which is immediately downstream of said first expansion portion 24 and whose length is greater than its diameter, and a second expansion portion 26 immediately downstream of the downstream end of said constant cross section portion 25. And a gas introduction port 27 opens into said constant cross section portion 25 at an intermediate point thereof.

In the upper part of the furnace shell 1 there is disposed a second melting pot 29, which is formed with a metallic vapor production chamber 50 which is not communicated with any gas introduction port and to which no reaction gas is introduced. A heater 30 is disposed around the melting pot 29 for keeping it at a predetermined temperature which will be hereinafter referred to as $T_3$, and a mass 31 of metal charged into the lower part of the metallic vapor production chamber 50 is kept in the molten state by the acting of this heater 30 and is, further, boiled so as to emit metallic vapor. Through the bottom wall 51 of the chamber 50 there is fitted a conduit 28, and the upper end of this conduit 28 protrudes quite a long way into the metallic vapor production chamber 50 so as to open to the upper portion of said chamber 50, above the surface of the molten metal mass 31 therein, while the lower end of the conduit 28 is connected to the gas introduction port 27 of the nozzle 11.

By using the device for making composite material shown in FIG. 1 and described above, composite material, the first preferred embodiment of the product of the present invention, using as a matrix metal magnesium alloy (Japanese Industrial Standard JIS MC2F) and including as reinforcing material fine composite powder consisting of powder particles each of which was made of extremely small reinforcing particles of silicon nitride embedded in a matrix of metallic silicon, was made according to the first preferred embodiment of the method of the present invention, as follows. First, a mass 7 of metallic silicon was charged into the lower part of the metallic vapor production and reaction chamber 5, and similarly a mass 31 of metallic silicon was charged into the lower part of the metallic vapor production chamber 50, and also a mass 61 of magnesium alloy (JIS standard MC2F) was charged into the matrix metal bath 60. Then the temperature of the first melting pot 2 and the chambers 4 and 5 defined therein was rapidly raised to a temperature $T_1$ of approximately 2200° C. by operating the heater 6, while a steady flow of nitrogen gas was introduced through the gas introduction aperture 3. Thus the silicon in the chamber 5 was melted, and was further steadily boiled to produce silicon vapor in the chamber 5, this silicon vapor mixing with the nitrogen gas flowing into said chamber 5 and starting to react therewith to produce silicon nitride. The mixture gas thus produced (in which the nitrogen gas was thus reacting with the silicon vapor) then entered the upper end of the conduit 10 and passed down through said conduit 10, to pass through the throat portion 23 of the nozzle 11 into the expansion portion 24 of said nozzle. In this expansion portion 24, the reaction mixture gas was cooled at a very high rate by adiabatic expansion cooling, to an estimated temperature of about 650° to 850° C., thereby producing very fine particles of silicon nitride. The flow out from this expansion portion 24, in which the reaction between the silicon and the nitrogen gas remaining was no longer occurring, then passed down the constant cross section portion 25 of the nozzle 11. Into this flow was then mixed a flow of silicon vapor which was produced by the silicon mass 31 in the metallic vapor production chamber 50 being melted by the operation of the heater 30, and being further steadily boiled to produce silicon vapor in the chamber 50 to a temperature of approximately 2000° C., said silicon vapor then passing down through the conduit 28 and through the gas introduction port 27. These mixed flows then flowed into the second expansion portion 26 of the nozzle 11, and were expelled as a jet flow 12 from the downstream end of said second expansion portion 26, i.e. from the outlet of the convergent-divergent nozzle 11, said jet flow 12 squirting into the composite material production zone 9 and being directed downwards at the matrix metal in the bath 60, which was brought to a molten condition at a temperature of approximately 670° to 700° C. by the operation of the heater therefor, not particularly shown. During the above processing, the vacuum pump 18 was operated at such an appropriate rate, the valve 17 was so adjusted, and the flow rate of the nitrogen gas introduced through the gas introduction aperture 3 was so controlled, as to keep the pressure $P_1$ within the metallic vapor production and reaction chamber 5 at approximately 30 torr (the partial pressure of the silicon vapor, $P_{Si}$, was about 0.2 to 2 torr), this pressure being also dependent on the temperature at which the mass of metallic silicon 7 was heated up, and the pressure $P_2$ within the composite material production zone 9 at approximately 1 to 3 torr.

During this process, the following chemico-physical reactions and processes are conjectured to have taken place, in view of the nature of the resultant product that was obtained which will be shortly described and in view of theory, although of course direct observation of what happened in the various portions of the nozzle 11 was quite impossible. The reaction mixture gas consisting of nitrogen gas and silicon vapor, as it passed through the first expansion portion 24 and was rapidly expanded and underwent rapid adiabatic cooling, to form extremely small particles of silicon nitrode very quickly, so that the flow consisted substantially of a jet of said small particles of silicon nitride carried along on a flow of excess nitrogen gas, said particles having average diameter about 0.01 microns. Then, the silicon vapor injected through the gas introduction port 27 mixed with these small silicon nitride particles and with the excess nitrogen gas entered into the second expansion portion 26 of the nozzle 11, and underwent very rapid expansion and adiabatic cooling therein. At this time, the metallic silicon cooled into fine powder particles while entraining the small silicon nitride particles into said powder particles, and these fine powder particles were finally expelled from the nozzle 11 into the composite material production zone 9 as the jet 12, which impinged on the surface of the mass 61 of molten magnesium alloy contained in the bath 60. The fine powder particles in the heat flow 12 were entrained into this molten magnesium alloy, thus helping to agitate the molten magnesium so as to disperse the entrained powder particles through its entire region, while the excess nitrogen gas was continuously exhausted from the apparatus by the pump 18. Finally, when all the silicon in the first melting pot 2 had been consumed, the apparatus was allowed to cool, and the solidified mass of matrix metal and reinforcing particles entrained thereinto, contained in the bath 60, was removed and examined.

Figure 2:
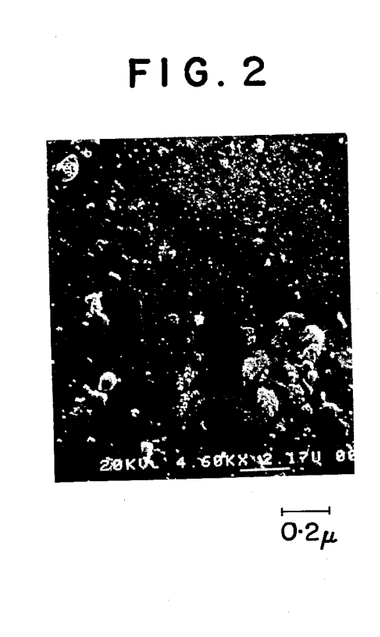
FIG. 2 is a transmission electron micrograph of said first preferred embodiment of the reinforced material of the present invention, produced by the apparatus of FIG. 1.
Figure 3:
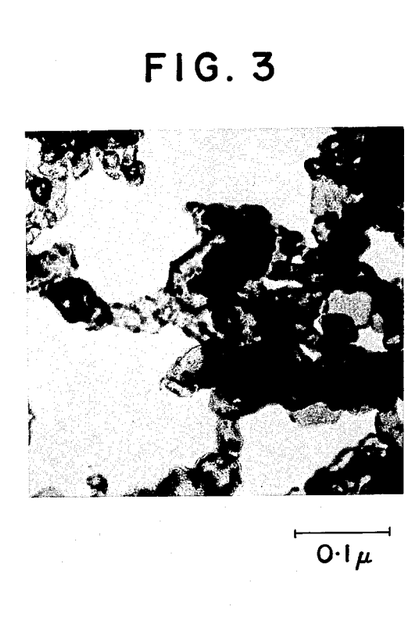
FIG. 3 is a transmission electron micrograph of the fine composite powder material incorporated in said first preferred embodiment of the reinforced material of the present invention, and ejected from the convergent-divergent nozzle of the apparatus of FIG. 1 into the molten matrix metal in the bath.
Figure 4:
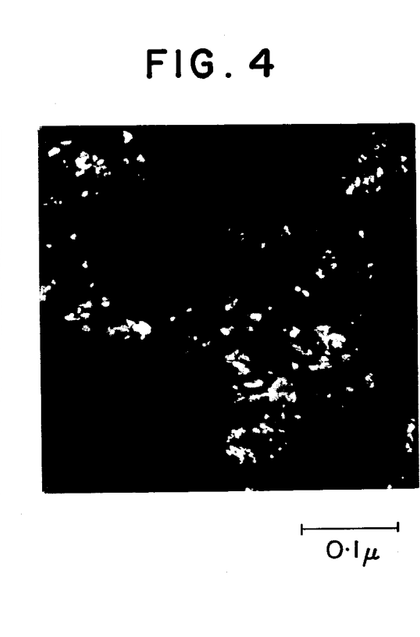
FIG. 4 is another transmission electron micrograph of said fine composite powder material, this time taken against a dark background.

FIG. 2 is a transmission electron micrograph of this material, i.e. of the first preferred embodiment of the reinforced material of the present invention, as produced by the apparatus of FIG. 1. It will be understood from this figure that the particles of the composite silicon nitride-silicon matrix fine powder material (the white blotches in the figure) are very evenly dispersed in the magnesium alloy matrix metal (the grayish background portion). FIG. 3 is a transmission electron micrograph of the fine composite powder along, and FIG. 4 is another transmission electron micrograph of said fine composite powder material alone, but taken against a dark background. From these figures, it can be seen that the fine powder material has a structure in which its individual particles are themselves made up in a composite structure, each of them being composed of a number of extremely small silicon nitride particles (the white portions in FIG. 4) joined together by being embedded in a matrix of metallic silicon (the gray portions in FIG. 4). The average particle diameter of the fine composite powder was about 0.5 microns, while the average diameter of the small silicon nitride particles incorporated in the powder particles was about 0.01 microns. Because each particle of this fine composite powder material is very small, it was impossible to measure its hardness or its elasticity, but in view of its structure described above it is presumed that each of these particles had a hardness close to that of silicon nitride itself (and silicon nitride is a ceramic material which has extremely good hardness), and it is also presumed that each particle has a toughness much superior to that of a comparable particle made of silicon nitride alone (which would be rather brittle). Thus, it is presumed that the fine composite reinforcing particles included in the first preferred embodiment of the composite material of the present invention had properties appropriate to a composite material, much improved over those of either of the two materials of which they were made, and thus combined the good advantages of both said component materials while avoiding their individual deficiencies, as is typical for such composite materials.

Next, hardness, tensile strength, and wear tests were made of the composite material according to this first preferred embodiment. First, it was determined that the volume ratio of the reinforcing fine powder material in this composite material was about 4%. And for comparison similar tests were also carried out on a test sample made from pure magnesium alloy (JIS standard MC2F) and on another test sample made from magnesium alloy (JIS standard MC2F) in which reinforcing powder of pure silicon nitride ($Si_3N_4$) was included at the same volume ratio of about 4%.

In the case of the hardness tests at room temperature, the hardness of the composite material according to the present invention was about 68–72 Hv, while that of the pure magnesium alloy comparison sample was about 50 Hv and that of the comparison sample reinforced by pure silicon nitride particles was about 58–62 Hv. In the case of the tensile strength tests, the strength of the composite material according to the present invention was about 34–37 kg/mm$^2$, while that of the pure magnesium alloy comparison sample was about 24 kg/mm$^2$ and that of the comparison sample reinforced by pure silicon nitride particles was about 27–30 kg/mm$^2$. And in the case of the wear tests, which were performed based on the LFW method, with load 15 kg, test time 30 minutes, using oil as a lubricant, the wear amount of the composite material according to the present invention was about 1.4 mg, while that of the pure magnesium alloy comparison sample was about 10 mg and that of the comparison sample reinforced by pure silicon nitride particles was about 2.2 mg; and it was noticed, by observation of the surface of each of the test pieces after the wear test, that the fine powder reinforced composite material according to the present invention was far less prone to dropping out and scaling off of the fine powder reinforcing material, than was the comparison composite material sample in which pure silicon nitride particles were used as the reinforcing material.

Thus, it was found that a composite material using, as reinforcing powder material, composite powder in which the particle diameters of the ceramic material were very much smaller than those attainable in the case of pure ceramic powder was improved with regard to hardness and tensile strength thereof over composite material using pure ceramic powder particles as the reinforcing material, while also the wear resistance was improved and the tendency to deterioration during wear was greatly improved.

EMBODIMENT TWO

Figure 5:
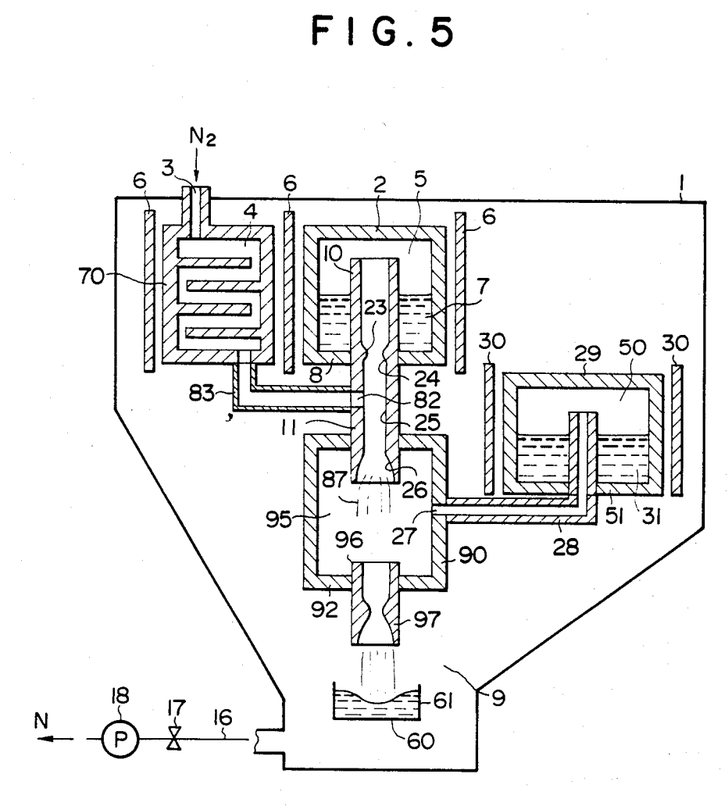
FIG. 5 is a schematic sectional view, similar to FIG. 1, of an apparatus which is the second preferred embodiment of the device of the present invention and this time incorporates two convergent-divergent nozzles connected by a mixing chamber, for making a composite powder reinforced material which is a second preferred embodiment of the reinforced material of the present invention, according to the second preferred method embodiment of the present invention.

In FIG. 5, there is shown a schematic sectional view of the second preferred embodiment of the device for making a composite reinforced material of the present invention, in a fashion similarly to FIG. 1 with respect to the first apparatus embodiment. In this figure, parts which are similar to parts of the first preferred embodiment shown in FIG. 1 and which have the same functions are denoted by the same reference numerals.

In this second preferred apparatus embodiment, a furnace shell 1 is provided as before, and in the upper part of the furnace shell 1 there is disposed a first melting pot 2. There is also provided, separately from this first melting pot 2, a gas preheating device 70, within which there is defined a gas preheating chamber 4 to which is communicated a gas introduction aperture 3 which is communicated with the outside for introduction of a reaction gas such as nitrogen gas. The first melting pot 2 is formed with a first metallic vapor production chamber 5, and a heater 6 is disposed around the first melting pot 2 and the gas preheating device 70 for keeping them at a predetermined temperature which will be hereinafter referred to as $T_1$. A mass 7 of metal charged into the lower part of the first metallic vapor production chamber 5 is kept in the molten state by the action of this heater 6 and is, further, boiled so as to emit metallic vapor.

Through the bottom wall 8 of the chamber 5 there is fitted a conduit 10 which leads to a mixing chamber 95, defined within the body of a mixing device 90. The upper end of the conduit 10 protrudes quite a long way into the metallic vapor production chamber 5 so as to open to the upper portion of said chamber 5, above the surface of the molten metal mass 7 therein. The interior of the conduit 10 defines a first nozzle 11 which has a first gas introduction port 82 at an intermediate point therealong, and this first nozzle 11 opens downward into the mixing chamber 95 so as to direct a jet flow 87 of gas and powder downwards thereinto as will be explained shortly. Through the bottom wall of the mixing chamber 92 there is fitted a second nozzle 96 which leads to a composite material production zone 9, and this second nozzle 96 opens downward into the composite material production zone 9 so as to direct a jet flow 12 of gas and power downwards thereinto. Through the bottom wall of the gas preheating device 70 there is fitted a conduit 83, and the lower end of the conduit 83 is connected to said first gas introduction port 82 of the first nozzle 11.

Below the end of the second nozzle 96 in the composite material production zone 9 and displaced therefrom by a certain distance there is provided, for catching fine composite powder particles produced in the jet flow 12 from said second nozzle 96 as will be explained shortly, opposing the tip of the second nozzle 96 at a certain distance away therefrom, a bath 60 adapted for receiving a quantity of molten matrix metal 61. A heater, which again is not shown, is provided for melting the matrix metal 61, and for keeping it in the molten state, (if actually extra heat is required for this purpose). A vacuum pump 18 is provided for exhausting, via a conduit 16 under the control of a valve 17, the reaction gas such as nitrogen gas introduced through the gas introduction aperture 3 from the composite material production zone 9 and from the whole device, so as to maintain the interiors of the metallic vapor production chamber 5 and of the composite material production zone 9 at predetermined pressures, which will be hereinafter referred to as $P_1$ and $P_2$ respectively.

The first nozzle 11 has a throat portion 23, a first expansion portion 24 immediately downstream of said throat portion 23, a constant cross section portion 25 the upstream end of which is immediately downstream of said first expansion portion 24 and whose length is greater than its diameter, and a second expansion portion 26 immediately downstream of the downstream end of said constant cross section portion 25, while the first gas introduction port 82 opens into said constant cross section portion 25 at an intermediate point thereof. And the second nozzle 96 is of a per se well known convergent-divergent type, and has a throat portion 97 and an expansion portion 97 immediately downstream of said throat portion 23.

In the upper part of the furnace shell 1 there is disposed a second melting pot 29, which is formed with a second metallic vapor production chamber 50. A heater 30 is disposed around the melting pot 29 for keeping it at a predetermined temperature which will be hereinafter referred to as $T_3$, and a mass 31 of metal charged into the lower part of the second metallic vapor production chamber 50 is kept in the molten state by the action of this heater 30 and is, further, boiled so as to emit metallic vapor. Through the bottom wall 51 of the chamber 50 there is fitted a conduit 28, and the upper end of this conduit 28 protrudes quite a long way into the second metallic vapor production chamber 50 so as to open to the upper portion of said chamber 50, while the lower end of the conduit 28 is connected to a second gas introduction port 27 which leads into the mixing chamber 95 of the mixing device 90.

As a modification, it would be possible for the exit opening of the first nozzle 11, i.e. the exit of the second expansion portion 26 thereof, to be located very close to the intake opening of the second nozzle 96, so as to provide a positive suction action for the gas issuing out from the second gas introduction port 27.

By using the device for making composite reinforced material shown in FIG. 5 and described above, a reinforced material, in which the matrix metal was magnesium alloy of Japanese Industrial Standard MC2F and the reinforcing material was a powder of fine particles each of which was made of extremely small reinforcing particles of aluminum nitride embedded in a matrix of metallic aluminum, was made according to the second preferred embodiment of the method of the present invention, as follows. First, a mass 7 of metallic aluminum was charged into the lower part of the first metallic vapor production chamber 5, and similarly a mass 31 of metallic aluminum was charged into the lower part of the second metallic vapor production chamber 50, and also a mass 61 of magnesium alloy (JIS standard MC2F) was charged into the matrix metal bath 60. Then the temperature of the first melting pot 2 and the chamber 5 defined therein was rapidly raised to a temprature $T_1$ of approximatly 1900° C. by operating the heater 6, while concurrently the temperature of the gas preheating device 70 was raised to about 1500° C. or so by this heater action, and while a steady flow of nitrogen gas was introduced through the gas introduction aperture 3.

The vacuum pump 18 was operated at such an appropriate rate, the valve 17 was so adjusted, and the flow rate of the nitrogen gas introduced through the gas introduction aperture 3 was so controlled, as to keep the pressure $P_1$ within the first metallic vapor production chamber 5 at approximately 35 to 40 torr (of course this pressure was primarily determined by the temperature at which the mass 7 of metallic aluminum was heated up), and the pressure $P_2$ within the composite material production zone 9 at approximately 1 to 3 torr. Thus the aluminum in the first metallic vapor production chamber 5 was melted, and was further steadily boiled to produce aluminum vapor in the chamber 5. The flow of this aluminum vapor then entered the upper end of the conduit 10 and passed down through said conduit 10, to pass through the throat portion 23 of the nozzle 11 into the expansion portion 24 of said nozzle. In this expansion portion 24, the aluminum vapor was cooled at a very high rate by abiabatic expansion cooling, to an estimated temperature of about 1500° C. or so and to an estimated pressure of 20 to 25 torr. The flow out from this expansion portion 24 of the nozzle 11 then passed down the constant cross section portion 25. Then this aluminum vapor, in the constant cross section portion 25, was mixed with the flow of nitrogen gas which was heated in the gas preheating device 70 to a temerature of also about 1500° C. and flowed through the conduit 83 and through the first gas introduction port 83 into said constant cross section portion 25 of the nozzle 11, and the aluminum vapor and the nitrogen gas started to react together to produce aluminum nitride. This mixed flow then flowed into the second expansion portion 26 of the nozzle 11, and was expelled as a jet flow 87 from the downstream end of said second expansion portion 26, i.e. from the outlet of the nozzle 11, said jet flow 87 squirting into the chamber 95 of the mixing device 90, while being further subjected to rapid adiabatic expansion cooling and thus no further reaction having occurred. The chamber 95 was kept at a temperature of about 900° to 1100° C., and at a pressure of about 5 torr. A flow of aluminum vapor which was produced by the aluminum mass 31 in the second metallic vapor production chamber 50 being heatd by the operation of the heater 30 at an approximate temperature of 1700° C. and at a pressure of about 10 torr was introduced into the chamber 95 through the conduit 28 and through the gas introduction port 27 to be mixed with the above mixture of fine particles of aluminum nitride and nitrogen gas. These mixed flows then flowed into the second nozzle 96, and were expelled as a jet flow 12 from the downstream end of said second nozzle 96, and were cooled at a very high rate by adiabatic expansion cooling during passage through said second nozzle 96, said jet flow 12 squirting into the composite material production zone 9 and being directed downwards at the matrix metal in the bath 60, which was brought to a molten condition at a temperature of approximately 670° to 700° C. by the operation of the heater therefor, not particularly shown.

During this process, similar chemico-physical reactions and processes as in the first embodiment are conjectured to have taken place, in view of the nature of the resultant product that was obtained which, although no particular transmission electron micrographs of this material or of its constituents are shown, had a structure in which into the matrix metal were mixed particles of a fine powder material, the individual particles of this reinforcing fine powder material being themselves made up in a composite structure, each of them being composed of a number of extremely small aluminum nitride particles joined together by being embedded in a matrix of metallic aluminum. The average particle diameter of the fine composite powder was again about 0.5 microns, while the average diameter of the small aluminum nitride particles incorporated in the powder particles was also about 0.01 microns. Because each particle of this fine composite powder material was very small, it was again impossible to measure its hardness or its elasticity, but in view of its structure described above it is presumed that each of these particles had a hardness close to that of aluminum nitride itself (and aluminum nitride is a ceramic material which has extremely good hardness), and it is also presumed that each particle had a toughness much superior to that of a comparable particle made of aluminum nitride alone (which would be rather brittle). Thus, it is presumed that the fine composite reinforcing particles included in the second preferred embodiment of the composite material of the present invention had properties appropriate to a composite material, much improved over those of either of the two materials of which they were made, and thus combined the good advantages of both said component materials while avoiding their individual deficiencies, as is typical for such composite materials.

Next, hardness, tensile strength, and wear tests were made of the composite material according to this second preferred embodiment, also. First, it was determined that the volume ratio of the reinforcing fine powder material in this composite material was about 7%. And for comparison similar tests were also carried out on a test sample made from pure magnesium alloy (JIS standard MC2F) and on another test sample made from magnesium alloy (JIS standard MC2F) in which reinforcing powder of pure aluminum nitride ($Si_3N_4$) was included at the same volume ratio of about 7%.

In the case of the hardness tests at room temperature, the hardness of the composite material according to the present invention was about 60–62 Hv, while that of the pure magnesium alloy comparison sample was about 50 Hv and that of the comparison sample reinforced by pure aluminum nitride particles was about 58–60 Hv. In the case of the tensile strength tests, the strength of the composite material according to the present invention was about 34–38 kg/mm$^2$, while that of the pure magnesium alloy comparison sample was about 24 kg/mm$^2$ and that of the comparison sample reinforced by pure aluminum nitride particles was about 29–31 kg/mm$^2$. And in the case of the wear tests, which were again performed based on the LFW method, with load 15 kg, test time 30 minutes, using oil as a lubricant, the wear amount of the composite material according to the present invention was about 1.5 mg, while that of the pure magnesium alloy comparison sample was about 10 mg and that of the comparison sample reinforced by pure aluminum nitride particles was about 2.0 mg; and it was again noticed, by observation of the surface of each of the test pieces after the wear test, that the fine powder reinforced composite material according to the second embodiment of the present invention was far less prone to dropping out and scaling off of the fine powder reinforcing material, than was the comparison composite material sample in which pure aluminum nitride particles were used as the reinforcing material.

FIGS. 6 through 9 show longitudinal sectional views of other types of convergent-divergent nozzle which can be used with the apparatus of the present invention.

These nozzles are similar or identical to ones described in the aforementioned prior patent application. In these figures, like parts are denoted by like numerals, sometimes with one or more primes affixed.

Figure 6:
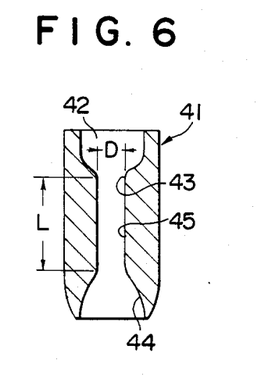
FIG. 6 is a longitudinal sectional view of a convergent-divergent nozzle which has a throat portion, a constant cross section portion of a certain length whose upstream end is immediately downstream of said throat portion, and an expansion portion immediately downstream of the downstream end of said constant cross section portion, and which is suitable for being used in certain other embodiments of the device of the present invention for practicing certain other method embodiments.
Figure 7:
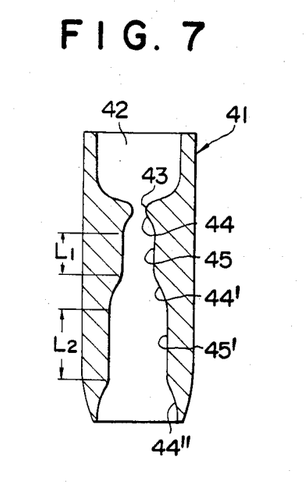
FIG. 7 is a longitudinal sectional view, similar to FIG. 6, of a convergent-divergent nozzle which incorporates a first constant cross section portion whose upstream end is immediately downstream of a first expansion portion which is immediately downstream of its throat portion, a second expansion portion immediately downstream of the downstream end of said first constant cross section portion, a second constant cross section portion the upstream end of which is immediately downstream of said second expansion portion, and a third expansion portion immediately downstream of the downstream end of said second constant cross section portion, and which is likewise suitable for being used in certain other embodiments of the present invention.

The nozzle 41 of FIG. 6 has an intake portion 42, a throat portion 43, a constant cross section portion 45 of a certain length "L" whose upstream end is immediately downstream of said throat portion 43, and an expansion portion 44 immediately downstream of the downstream end of said constant cross section portion 45; and this length "L" is greater than the diameter "D" of said constant cross section portion 45. The nozzle 41 of FIG. 7 has a first constant cross section portion 45 of length "L₁" whose upstream end is immediately downstream of a first expansion portion 44 which is immediately downstream of a throat portion 43, a second expansion portion 44' immediately downstream of the downstream end of said first constant cross section portion 45, a second constant cross section portion 45' of length "L₂" the upstream end of which is immediately downstream of said second expansion portion 44'', and a third expansion porton 44'' immediately downstream of the downstream end of said second constant cross section portion 45'. Depending upon the particular application and the properties required of the resulting composite material, a convergent-divergent nozzle with three or more constant cross sectional portions could be used.

Figure 8:
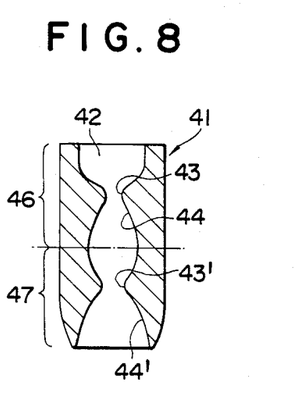
FIG. 8 is a longitudinal sectional view, similar to FIGS. 6 and 7, of a convergent-divergent nozzle which incorporates a first expansion portion which is immediately downstream of its first throat portion, a second throat portion immediately downstream of said first expansion portion, and a second expansion portion immediately downstream of said second throat portion, and which is likewise suitable for being used in certain other embodiments of the present invention.
Figure 9:
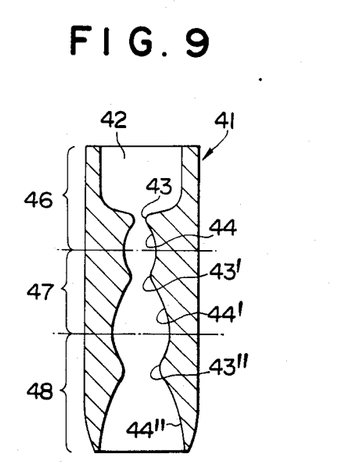
FIG. 9 is a longitudinal sectional view, similar to FIGS. 6, 7, and 8, of a convergent-divergent nozzle which incorporates a first expansion portion which is immediately downstream of its first throat portion, a second throat portion immediately downstream of said first expansion portion, a second expansion portion immediately downstream of said second throat portion, a third throat portion immediately downstream of said second expansion portion, and a third expansion portion immediately downstream of said third throat portion, and which is likewise suitable for being used in certain other embodiments of the present invention.

The nozzle 41 of FIG. 8 has a first expansion portion 44 which is immediately downstream of its first throat portion 43, a second throat portion 43' immediately downstream of said first expansion portion 44, and a second expansion portion 44' immediately downstream of said second throat portion 43'. And the nozzle 41 of FIG. 9 has a first expansion portion 44 which is immediately downstream of its first throat portion 43, a second throat portion 43' immediately downstream of said first expansion portion 44, a second expansion portion 44' immediately downstream of said second throat portion 43', a third throat portion 43'' immediately downstream of said second expansion portion 44', and a third expansion portion 44'' immediately downstream of said third throat portion 43''. Depending upon the particular application and the properties required of the resulting composite material, a convergent-divergent nozzle with three or more expansion portions could be used.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. For example, the ceramic small particles included in the particles of the reinforcing material of the composite material according to this invention need not be particles of a nitride, as was exemplarily shown in the described embodiments, but could be made of other ceramic materials such as oxides, carbides, or borides of various metls. Other modifications are also possible. Also, it is not essential that the material which is reacted with the element in the gas to form the very small ceramic particles should be the same material as is used for the matrix material of the reinforcing particles, although it is beneficial that the two materials should be the same from the point of view of obtaining good affinity between the ceramic particles and their matrix material. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. A composite material, comprising a matrix of a first metal and reinforcing first particles with average particle diameter less than or equal to about ten microns dispersed in said matrix of said first metal, said reinforcing first particles each having a composite structure which comprises a plurality of fine second particles of a ceramic and a matrix of a second metal.

2. A composite material according to claim 1, wherein said reinforcing first particles are substantially separated from one another.

3. A composite material according to claim 1, wherein the average particle diameter of said reinforcing first particles is less than or equal to about five microns.

4. A composite material according to claim 1, wherein said first metal is magnesium alloy.

5. A composite material according to claim 1, wherein said second metal is silicon.

6. A composite material according to claim 1, wherein said ceramic is silicon nitride.

7. A composite material according to claim 5, wherein said ceramic is silicon nitride.

8. A composite material according to claim 1, wherein said second metal is aluminum.

9. A composite material according to claim 1, wherein said ceramic is aluminum nitride.

10. A composite material accordng to claim 8, wherein said ceramic is aluminum nitride.

11. A device for making a composite material, comprising:
a first vaporization chamber for producing a first metal vapor in;
means for heating said first vaporization chamber;
an exit flow path from said first vaporization chamber, comprising a first expansion nozzle means therealong;
means for introducing a flow of reaction gas to be mixed with said metal vapor at the upstream of said first nozzle means;
a second vaporization chamber for producing a second metal vapor in;
means for heating said second vaporization chamber;
an exit flow path from second vaporization chamber which leads into a mixing area where said second metal vapor is mixed with the mixture of said reaction gas and said first metal vapor after said mixture has flowed through said first nozzle means;
a second expansion nozzle means which leads from said mixing area;
a composite material production zone into which said second nozzle means leads;
a molten metal bath in said composite material zone into which a flow out from said second nozzle means is directed;
and means for evacuating the interior of said device.

12. A device according to claim 11, wherein said first and second nozzle means and said mixing area are constituted by a compound convergent-divergent nozzle which has a throat portion, a first expansion portion downstream of said throat portion, a constant cross sectional portion downstream of said first expansion portion whose length is greater than its diameter, and a second expansion portion downstream of said constant cross sectional portion; further comprising means for mixing said reaction gas into said first metal vapor at a point upstream of said throat portion of said compound nozzle, said mixture thereof then being fed into said compound nozzle; and further comprising means for indroducing said second metal vapor into said constant cross sectional portion of said compound nozzle.

13. A device according to claim 11, wherein: said mixing area is defined as a mixing chamber; said first nozzle means is defined as a first compound convergent-divergent nozzle which has a throat portion, a first expansion portion downstream of said throat portion, a constant cross sectional portion downstream of said first expansion portion whose length is greater than its diameter, and a second expansion portion downstream of said constant cross section portion which opens into said mixing chamber; and said second nozzle means is defined as a second convergent-divergent nozzle which leads from said mixing chamber to said composite material production zone; further comprising means for introducing said reaction gas into said constant cross sectional portion of said first compound nozzle; and further comprising means for introducing said second metal vapor into said mixing chamber.

14. A method for making a composite material comprising a matrix of a first metal and reinforcing first particles with average particle diameter less than or equal to about ten microns dispersed in said matrix of said first metal, said reinforcing first particles each having a composite structure which comprises a plurality of fine second particles of a ceramic made by reacting together a second metal and a gas and being combined by a matrix of a third metal, comprising the steps of:
  mixing vapor of said second metal with said reaction gas and directing the mixture thereof through a first expansion nozzle means for adiabatic expansion cooling to generate fine particles of the compound of said second metal and said reaction gas;
  producing vapor of said third metal and mixing it in with said fine particles of said compound at the downstream of said first nozzle means;
  directing the resulting mixture through a second expansion nozzle means; and
  directing an output flow from said second nozzle means into a bath of said first metal.

15. A method according to claim 14, wherein said first and second nozzle means are constituted by a compound convergent-divergent nozzle which has a throat portion, a first expansion portion downstream of said throat portion, a constant cross sectional portion downstream of said first expansion portion whose length is greater than its diameter, and a second expansion portion downstream of said constant cross sectional portion; and wherein said reaction gas is mixed into said vapor of said second metal at a point upstream of said throat portion of said compound nozzle, said mixture thereof then being fed into said compound nozzle; and wherein said vapor of said third metal is mixed into said fine particles of said compound by being supplied into said constant cross sectional portion of said compound nozzle.

16. A method according to claim 14, wherein said first nozzle means is defined as a first compound convergent-divergent nozzle which has a throat portion, a first expansion portion downstream of said throat portion, a constant cross sectional portion downstream of said first expansion portion whose length is greater than its diameter, and a second expansion portion downstream of said constant cross sectional portion which opens into a mixing chamber, and said second nozzle means is defined as a second convergent-divergent nozzle which leads from said mixing chamber to direct its output flow at said bath of said first metal; wherein said vapor of said second metal is supplied into said first compound nozzle; wherein said reaction gas is mixed into said vapor of said second metal by being supplied into said constant cross sectional portion of said first compound nozzle; and wherein said vapor of said third metal is mixed into said fine particles of said compound by being supplied into said mixing chamber.

* * * * *